United States Patent [19]
Nelson

[11] Patent Number: 6,041,802
[45] Date of Patent: Mar. 28, 2000

[54] BULK STORAGE AND DISTRIBUTION SYSTEM FOR COOKING OILS

[76] Inventor: Richard J. Nelson, 212 Meadow Dr. North, Hudson, Wis. 54016

[21] Appl. No.: 09/204,437

[22] Filed: Dec. 2, 1998

Related U.S. Application Data

[60] Provisional application No. 60/067,259, Dec. 2, 1997.

[51] Int. Cl.[7] ........................................ F04F 1/06
[52] U.S. Cl. ............................ 137/14; 99/403; 137/209; 137/360; 141/1; 141/18
[58] Field of Search ................... 99/403; 141/1, 141/18; 137/14, 209, 360

[56] References Cited

U.S. PATENT DOCUMENTS

| | | |
|---|---|---|
| 4,646,793 | 3/1987 | Sherratt . |
| 4,683,921 | 8/1987 | Neeser . |
| 4,959,144 | 9/1990 | Bernard et al. . |
| 5,042,518 | 8/1991 | Singhe et al. ................ 137/209 X |
| 5,174,354 | 12/1992 | Neeser et al. . |
| 5,215,128 | 6/1993 | Neeser . |
| 5,249,511 | 10/1993 | Shumate et al. . |
| 5,617,777 | 4/1997 | Davis et al. . |

*Primary Examiner*—Gerald A. Michalsky
*Attorney, Agent, or Firm*—Anthony G. Eggink

[57] ABSTRACT

A bulk storage and distribution system for cooking oils. The system includes an apparatus and method to store and distribute cooling oil in an aseptic environment. The system includes a bulk storage tank, an oil inlet structure, an inert gas supply and an oil distribution structure having a dispensing nozzle. An inventory monitoring system and oil removal system are incorporated into the cooking oil storage and distribution system.

23 Claims, 4 Drawing Sheets

BULK STORAGE AND DISTRIBUTION SYSTEM FOR COOKING OILS

This application claims the benefit of U.S. Provisional Application Ser. No. 60/067,259, filed Dec. 2, 1997.

BACKGROUND OF THE INVENTION

This invention relates generally to a liquid distribution system and particularly to a bulk storage and distribution system for cooking oils.

In the past cooking oils have typically been distributed to restaurants and food manufacturers, for example, in containers, such as pails or lined cartons. The restaurant worker opens and lifts a 35 lb. container and fills the fryer structure as required. This method of operation is cumbersome, inefficient and does not provide a continuous fresh supply of cooking oil products where required. The cooking oil in restaurant fryers is typically maintained at 300–350° F. and splashing of the hot oil during fryer filling and draining has caused numerous burns and other injuries. The liquid distribution system of the present invention provides a bulk storage and distribution system for cooking oils that overcome the difficulties, inefficiencies and problems of the prior art.

The liquid distribution system of the present invention provides for the bulk delivery of cooking oils in a manner which is fast, fresh, safe, economical and convenient for restaurants, food preparation institutions and food manufacturers that use oil products in deep frying operations or in preparing products.

The bulk storage and distribution or dispersion system of this invention provides a number of benefits over the prior art. It is one object of this invention to provide an oil distribution system wherein the cooking oil is filled, stored and distributed in an aseptic manner thereby avoiding oil product contact with oxygen until it is distributed to the fryer or other location. The system of this invention further provides an oil fill box located outside the building to allow 24 hour access and delivery. The oil fill box may also be located in another secured area, for example. The fill device used in this invention includes a valve which prevents the venting of $CO_2$ (or other inert gas) from the tank until the coupling has been made between the delivery truck and fill box, thereby avoiding the introduction of oxygen to the system. The fill box further has a lockout device to assure access only by authorized distributors. The oil fill box is also provided with a lockout device on the $CO_2$ (or other inert gas) supply which can disable the tank in the event that the user does not comply with terms of the delivery contract (i.e., payment upon delivery).

The oil distribution system uses a bulk storage tank wherein oil is stored under pressure blanketed by $CO_2$, nitrogen or other inert gas. The $CO_2$ or other inert gas keeps the oil in an oxygen free environment as the tank level goes down thereby aiding in the long term preservation of oil. In addition to displacing oxygen, the pressurized $CO_2$ serves as the motive force to push the oil through the delivery system to thereby eliminate the need for a pump.

The oil distribution system utilizes a storage tank which is preferably a stainless steel pressure vessel built in accordance with ASME pressure vessel codes. The vessel structure includes safety relief valves etc. The storage tank may also be provided with an inventory monitoring and management system which can be read remotely (via phoneline, for example) to assure that the storage tank is filled when needed. The storage tank is designed to meet applicable codes for cleanliness, such as 6" legs for mop space where required, a 4B polished stainless steel exterior, etc.

The cooking oil is distributed via pipes directly from the bulk storage tank to the point of use such as to the fryers. The system of this invention requires no mechanical parts or pumps between the tank and the dispensing nozzle. The dispensing nozzle is preferably spring loaded to control flow and to prevent flow when it is left unattended.

An oil removal system which is also based on $CO_2$ pumping may also be used in conjunction with the system of this invention. The removal system includes a drain tank which is sized to fit one fryer. When a fryer is drained a valve on the recovery drain tank is closed and is pressurized with $CO_2$ to thereby purge oil from the system. Once drained, the drain tank is ready for the next fryer or it may remain empty until the fryers are changed again. By avoiding contact with oxygen by utilizing $CO_2$, or like inert gas, the oils do not get oxidized and thereby get rancid.

SUMMARY OF THE INVENTION

The bulk storage and distribution system of this invention relates to the distribution of liquids such as cooking oils, under pressure. The storage and distribution system is comprised of a bulk storage tank having an inlet and outlet for receiving, storing, and distributing cooking oils, for example. The storage tank is connected to an inlet structure located on the outside of the building. A $CO_2$ or other inert gas supply is connected at the top of the storage tank to distribute, under a predetermined pressure, cooking oil through oil supply piping to a point of use, such as to a fryer apparatus. A flexible hose and fill valve connected at the end of the oil supply piping permits a cook or other restaurant worker to provide cooking oil to the fryer in a flow controlled manner.

The distribution system of this invention allows cooking oil to be stored and disposed of in an aseptic manner. The system has a fill box located outside the building for delivery of the oil by truck, for example. The fill device has a coupling for discharging $CO_2$ (or other inert gas) and for the delivery truck to engage the fill box. The fill box includes a lockout device to assure access only to authorized parties, such as predetermined oil distributors. The fill box has a lockout device on the $CO_2$ (or other inert gas) supply which controls the operation of the storage tank. The oil is stored under pressure blanketed by $CO_2$, nitrogen or other inert gas.

The storage tank is kept under pressure during use to provide a motive force to the system thereby eliminating the need for a pump. The tank is preferably a stainless steel pressure vessel constructed under ASME specifications. The distribution system may optionally be fitted with inventory monitoring and management system and may be monitored or read from a remote location. The cooking oil is distributed through pipes or conduits to the point of use, such as to fryers. The distribution pipe end has a dispensing nozzle which is preferably spring loaded to control oil flow and shut-off when not in use. The oil fill, bulk storage and disbursement system may further have a separate oil removal system also based on $CO_2$ pumping into a drain tank fit for one fryer, for example. A valve on the recovering drain tank is closed and is pressurized with $CO_2$ until the next fryer is required to be emptied.

These and other benefits of this invention will become clear from the following description by reference to the drawings.

DESCRIPTION OF THE PREFERRED EMBODIMENTS

Figure 1:
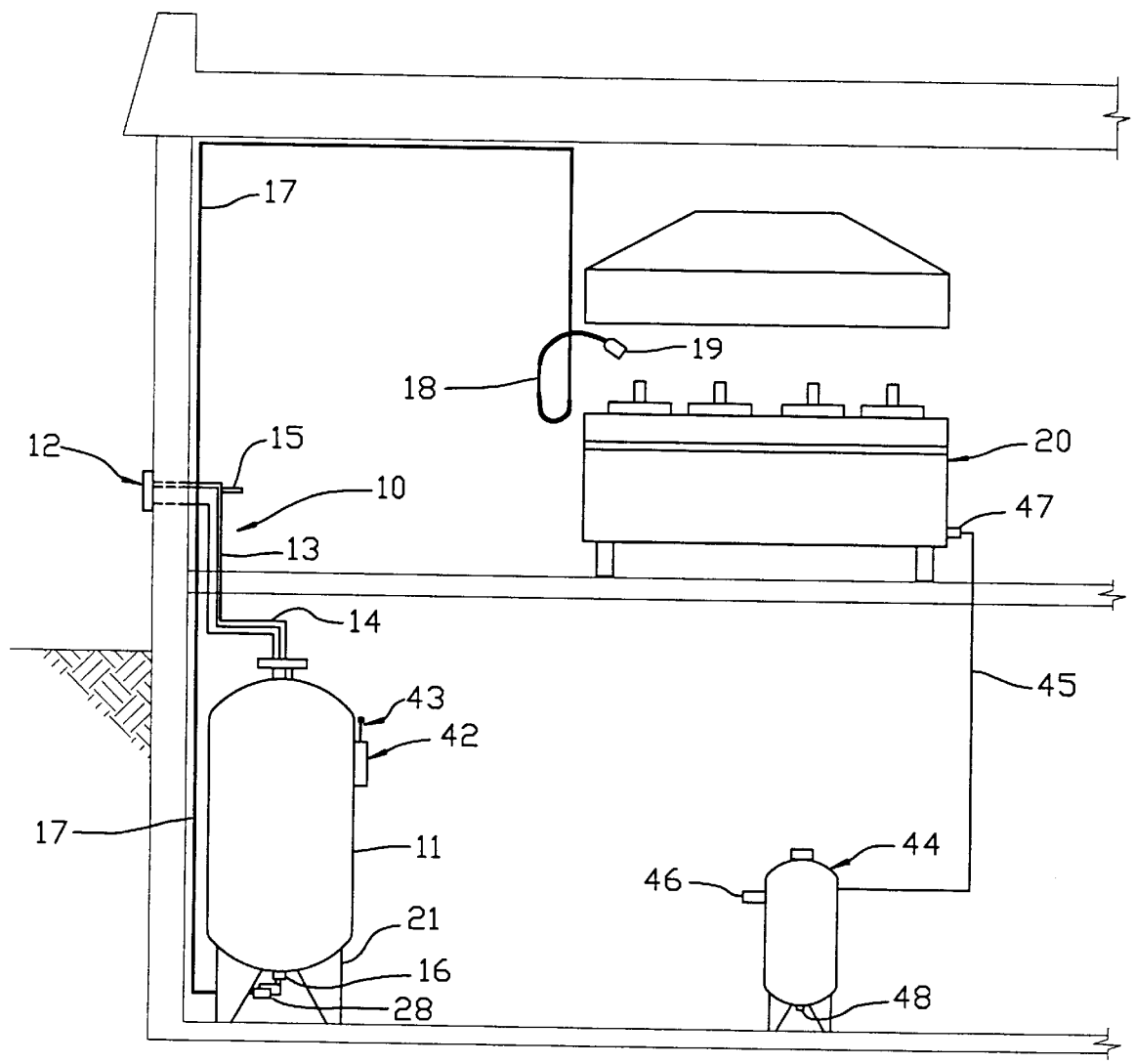
FIG. 1 is an elevational view showing the cooking oil distribution system of the present invention.

FIG. 1 shows a bulk storage and distribution system 10 of the present invention. The storage and distribution system 10 is for cooking oils as used in a restaurant, for example. The storage and distribution system 10 is shown to include a bulk storage tank 11 which is filled at an inlet structure 12 located on the outside of the building. A fill and vent pipe 13 and a $CO_2$ pipe 14 is shown connecting the inlet structure and the storage tank 11.

The inlet structure 12 includes a security device, such as a lock, to permit access only by authorized personnel. The inlet structure 12 further includes a three-way valve (not shown) which permits $CO_2$ shut-off, $CO_2$ venting of the storage tank 11, filling of the storage tank 11 and $CO_2$ pressure reactivation after the storage tank 11 is filled and before the inlet structure 12 is again locked. A float ball check valve on the $CO_2$ vent in the bulk storage tank may also be utilized. The fill pipe 13 connects the inlet structure to the storage tank 11 and may comprise a 2 inch diameter pipe to allow fast filling of the cooking oil (i.e., soybean oil, canola oil or the like).

Figure 2:
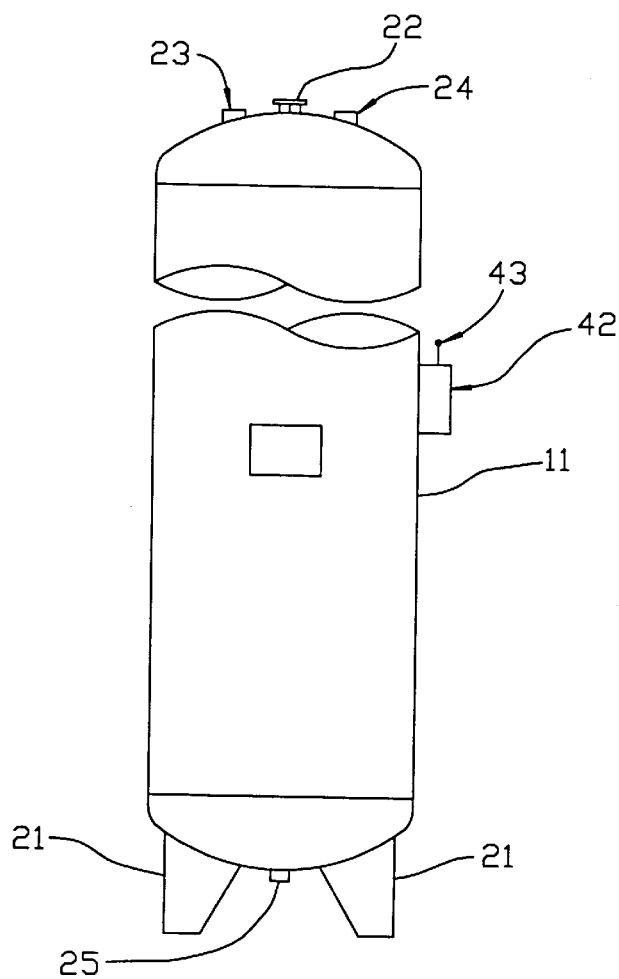
FIG. 2 is an elevational view showing the bulk oil storage tank used in the distribution system of the invention.
Figure 3:
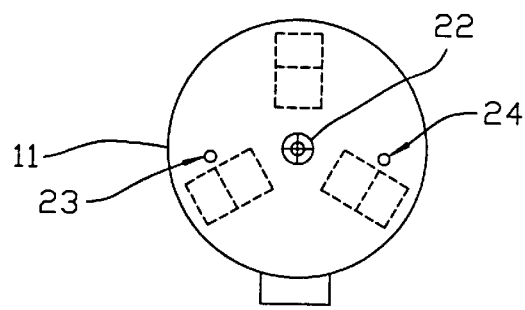
FIG. 3 is a top view of the bulk oil storage tank of FIG. 2.

Referring to FIGS. 1–3 the $CO_2$ supply is shown supplied to a connector 15. The $CO_2$ supply may be provided on the building premises and may or may not be a part of the present invention. A $CO_2$ pressure regulator (not shown) is provided to supply a predetermined pressure, i.e. 15–50 p.s.i., to the oil supply tank 11. The $CO_2$ connection, although described herein to be controllable at the inlet structure 12, may also be positioned for control at other locations in the storage and oil distribution system as would be known to those skilled in the art. A filter/drier device (not shown) may be installed in the $CO_2$ line to take any impurities or moisture out of the $CO_2$ source.

FIG. 1 further shows an outlet 16 positioned at the bottom of storage tank 11. An isolation or shut-off valve 28 is shown in the oil supply piping 17 which extends through the restaurant building and terminates at the point of use, such as at a fryer 20. The piping 17 may comprise ¾–1¼ inch diameter pipes constructed of food grade materials, such as PVC, stainless steel or the like. As shown, a flexible hose, i.e., flexible reinforced PE, braided stainless steel hose or the like, having a dispensing nozzle 19 is accessible at fryer 20. It is within the purview of this invention to have oil supply piping 17 directly connected to the device or apparatus where the oil is to be used. A liquid level control device or other oil metering means may be used to control the distribution of oil from the storage tank 11. A level sensor and solenoid valve arrangement may be utilized to accomplish the latter installation.

As shown in FIG. 1, the dispensing or fill valve 19 is accessible to the fryer 20. The fill valve or dispensing device 19 preferably has a spring controlled valve which automatically shuts off when the oil dispenser device 19 is not in use. The activation of the dispensing nozzle lever further permits a cook, for example, to safely control the flow of the oil into fryer 20. Any dispenser having autoshutoff and fluid flow control features may be used in this invention.

Figure 2A:
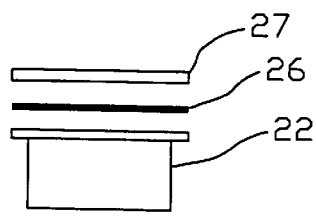
FIG. 2a is a plan view showing the inlet coupling of the storage tank of FIG. 2.

FIGS. 2 and 3 show a tank structure 11 which may be used in the bulk storage and distribution system 10 of this invention. The tank 11 is shown to have an inlet coupling 22 at the top and an outlet coupling 25 at the bottom and may have a capacity to hold 100–300 gallons of cooking oil, for example, based upon periodic requirements. Legs 21 are provided so that the tank 11 is raised off the floor according to code, i.e. to permit cleaning. Couplings 23 and 24 are shown at the top of tank 11 and which may be used for connection to a pressure gauge and a vent valve (not shown). The inlet coupling 22 is further shown in FIG. 2a to have a gasket and cap which are used for shipment of tank 11. In use, as shown in FIG. 1, the inlet coupling 22 is connected to fill pipe 13. The $CO_2$ pipe connection or vent pipe 14 may also be made at inlet coupling 22, however, as discussed above, the latter $CO_2$ pipe arrangement may vary. For example, a $CO_2$ supply connector 15 may be used, however, access into the building or to the tank would be required for oil tank filling purposes. For example, a shut-off valve and pressure regulator would be required between the $CO_2$ supply connector and the $CO_2$ supply.

As shown in FIGS. 1 and 2, the bulk storage tank 11 has an oil monitoring and inventory control system 11 having a transmitting/receiving device 43. The system 42 monitors the oil level in tank 11 via any conventional means. The transmitting/receiving device 43 permits the oil supplier to make contact via a telephone line, for example, and to monitor the oil volume in tank 11. The supplier, thereby, is able to schedule periodic oil deliveries.

It is an object of this invention to provide an oil distribution system wherein the cooking oil is filled, stored and disposed of in a aseptic manner, thereby avoiding oil product contact with oxygen until it is distributed to the fryer or other location. The invention further provides an oil fill box located outside the building to allow 24 hour delivery. In other operations, however, the fill box may be located in another secured area. The fill device includes a valve which prevents the venting of $CO_2$ (or other inert gas) from the tank until the coupling has been made between the delivery truck and fill box, thereby avoiding the introduction of oxygen to the system.

Importantly, the fill box has a lockout device to assure access only by authorized distributors. The fill box includes a lockout device on the $CO_2$ (or other inert gas) supply which can disable the tank in the event that the user does not comply with the terms of delivery. This feature provides a restaurant or other party with the ability to ensure for payment on delivery, for example.

The cooking oil is stored under pressure blanketed by $CO_2$, nitrogen or other inert gas. The gaseous blanket maintains the oil in an oxygen free environment as the storage tank level goes down thereby aiding in the long term preservation of oil. In addition to displacing oxygen the pressurized $CO_2$ serves as the motive force to push the oil through the delivery system to thereby eliminate the need for a pump.

The storage tank is preferably a stainless steel pressure vessel built in accordance with ASME pressure vessel codes.

The storage vessel preferably includes safety relief valves, etc. as required. The tank may optionally be fitted with an oil or other liquid inventory monitoring and management system which can be read remotely (via phoneline, for example) to assure the storage tank is filled when needed. The tank is designed to meet applicable codes for cleanliness such as 6" legs for mop space, a 4B polished stainless steel exterior, etc.

The cooking oil is piped directly from the bulk storage tank to a point of use, such as to deep fryers. The system of this invention requires no mechanical parts or pumps between the tank and the dispensing nozzle. The nozzle is preferably spring loaded to control fluid flow and to prevent opening when left unattended.

An oil removal system which is also based on $CO_2$ pumping may also be used in conjunction with this invention. The oil removal system includes a drain tank which is sized to fit one fryer, for example. When a fryer is drained a valve on the recovery drain tank is closed and is pressurized with $CO_2$, thereby purging oil from the system. At this point the drain tank is ready for the next fryer or for sitting empty until the fryers are changed again. By avoiding contact with oxygen by filling the system with $CO_2$ the used oils are prevented from getting rancid.

As shown in FIG. 1, an oil recovery tank 44 is connected via piping 45 to fryer 20. When the cooking oil in the fryer 20 needs to be drained, valve 47 is opened and the used oil is drained into holding tank 44. Connection 46 is provided to permit the inert gas to be introduced into tank 44 to thereby maintain the used oil in an aseptic environment. Drain line 48 is positioned on the tank 44 to permit the used oil to be removed from the holding tank 44. Drain line 48 may be connected to piping to permit the used oil to be pumped from any desired location, i.e., at a location outside of the building.

Figure 4:
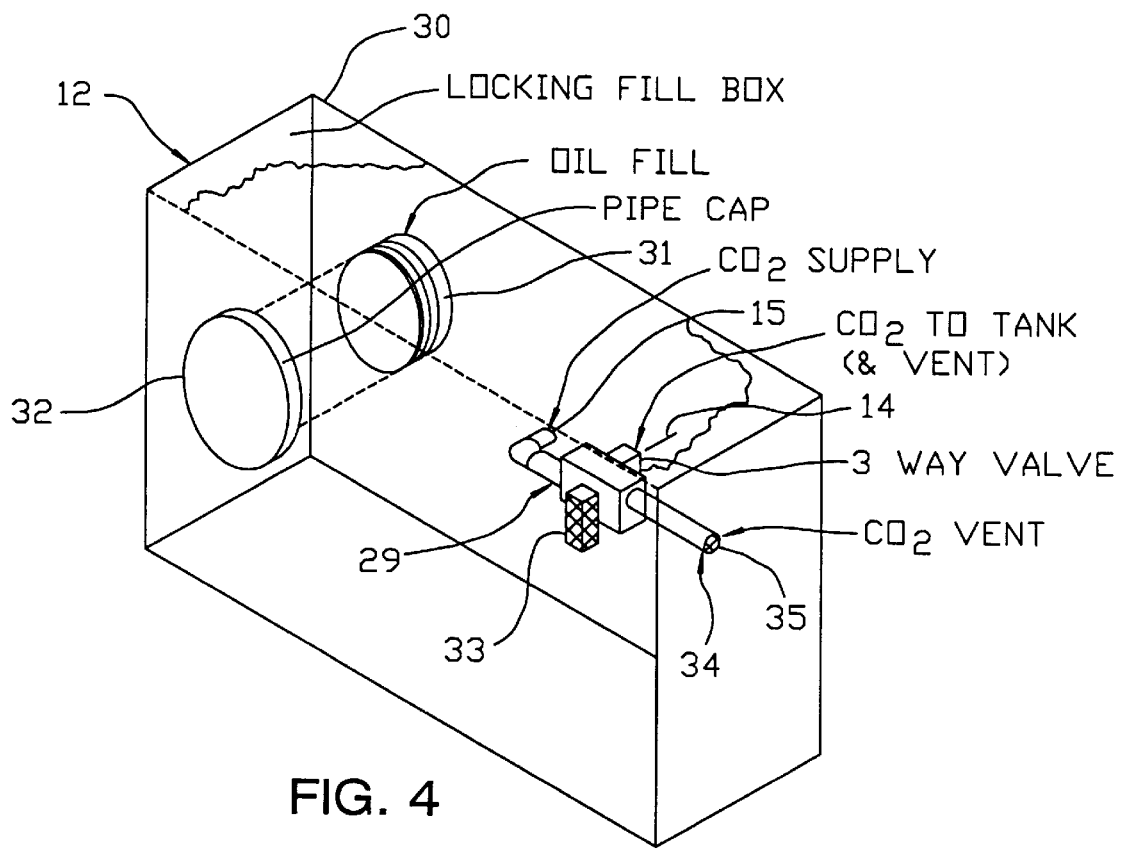
FIG. 4 is an isometric view of the oil fill structure used in the storage and distribution system of the invention.
Figure 5:
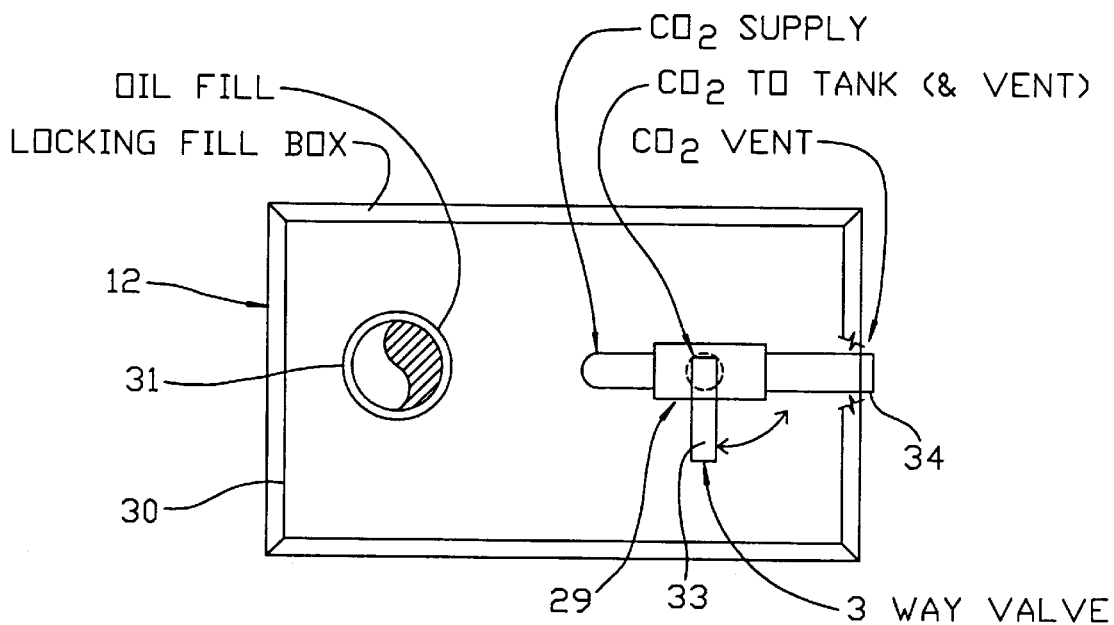
FIG. 5 is a frontal view of the oil fill structure of FIG. 4.

As shown in FIGS. 4 and 5, the oil inlet or oil fill structure 12 is shown. The structure 12 includes a housing 30 having a cover and lock (not shown) which is locked and accessible only to authorized personnel. As shown, the structure 12 includes the cooking oil pipe end 31, a cover 32 for the pipe end 31, an inert gas control mechanism having a lever 33 for the 3-way valve 29 and the $CO_2$ pipe vent 34. In operation, to fill the bulk storage tank 11, the fill box structure 12 is first unlocked. Next the lever 33 is turned to operate the 3-way valve 29 by shutting off the $CO_2$ supply 15 and permitting the tank 11 to vent. The oil from the truck is now transferred into the bulk tank 11 via the oil pipe 31. When the storage tank 11 is filled, the filling process will automatically stop as will be further described with respect to FIGS. 6 and 7. The fill nozzle from the truck is next removed and the cap 32 is secured to cover the fill pipe 31. Next, the valve lever 33 is returned to its original position thereby closing the vent pipe 34 and causing the $CO_2$ supply 15 to communicate with the bulk tank 11. Finally, the fill box 12 is locked and secured. Although the fill box operation as described represents one way in which oil can be transferred to the bulk storage tank 11 from the outside of a building, other structures and methods may be utilized according to the invention. The important aspect of the invention being a secure fill box accessible to authorized personnel and one that permits control of the $CO_2$ supply to the tank and which permits the ability to fill the bulk storage tank from the fill box.

Figures 6, 7:
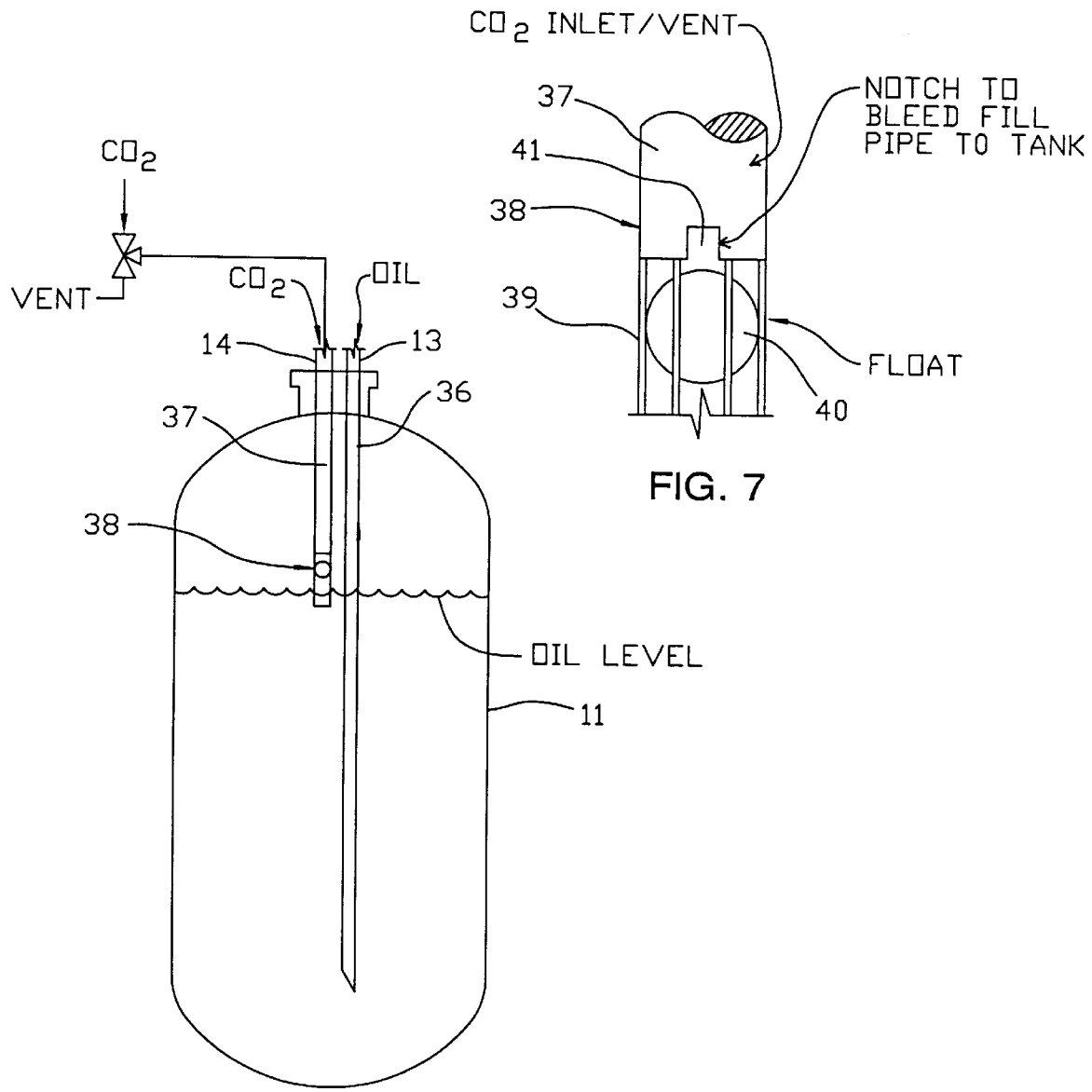
FIG. 6 is a sectional view of the oil storage tank and showing the oil fill and $CO_2$/vent pipes extending thereinto.
FIG. 7 is an enlarged view of the bottom of the $CO_2$/vent pipe and showing the oil fill stop device mounted at the end thereof.

FIGS. 6 and 7 show the bulk storage tank 11 having an oil fill stop system 38 which controls the flow of oil from the fill box 12 to the storage tank 11. As shown, the oil inlet pipe 36 extends into the bottom of the tank 11, for example, terminating within 6 inches from the tank bottom. This configuration controls the flow of oil into the tank and minimizes splashing, etc. Further shown is the $CO_2$ inlet pipe 37 which terminates toward the top of the storage tank 11 and which is shown to have a fill stop mechanism 38 at the bottom of the pipe 37, as shown in greater detail in FIG. 7. The $CO_2$ inlet/vent pipe 37 is shown in FIG. 7 to have a caged float 40, i.e., a teflon ball, which floats on and rises with the oil level during the filling process within cage 39. The pipe 37 is shown to have a notch 41 which permits the oil flow to trickle into the tank 11 at the end of the filling process. The notch 41 extends slightly above the float 40 to permit the final oil volume to drain into the tank.

As many changes are possible to the embodiments of this invention utilizing the teachings thereof, the descriptions above, and the accompanying drawings should be interpreted in the illustrative and not the limited sense.

That which is claimed is:

1. A bulk storage and distribution system for cooking oils comprising:
    a) a storage tank having an inlet and outlet;
    b) an oil receiving structure in communication with said storage tank inlet;
    c) inert gas supply means in communication with and providing inert gas to said storage tank;
    d) an inert gas control mechanism constructed and arranged to permit shut-off and venting of said inert gas and activation of said inert gas supply means for repressurization of said tank;
    e) a secure fill box comprising a housing surrounding said oil receiving structure and said inert gas control mechanism; and
    f) cooking oil distribution means in communication with said storage tank outlet and further having a terminal end.

2. The bulk storage and distribution system of claim 1, wherein said inert gas control mechanism includes a 3-way valve.

3. The bulk storage and distribution system of claim 2, wherein said 3-way valve is further comprised of a lock-out device.

4. The bulk storage and distribution system of claim 1, wherein said inert gas supply means is comprised of pressurized $CO_2$.

5. The bulk storage and distribution system of claim 1, wherein said storage tank has an inventory monitoring and management system.

6. The bulk storage and distribution system of claim 5, wherein said inventory monitoring and management system includes means to monitor the cooking oil level from a remote location.

7. The bulk storage and distribution system of claim 1, wherein said oil distribution means includes a piping system.

8. The bulk storage and distribution system of claim 1, wherein said terminal end of said oil distribution means comprises a dispensing nozzle.

9. The bulk storage and distribution system of claim 1, wherein said system includes a fryer and wherein an oil removal system is in communication with said fryer.

10. The bulk storage and distribution system of claim 9, wherein said oil removal system includes a drain tank having a valve and wherein said valve is in communication with said inert gas supply.

11. A method of storing and distributing cooking oil to a facility comprising:
    a) supplying to said facility a storage tank having an inlet and outlet, with a quantity of cooking oil, a secured oil receiving structure having a valve and being in communication with said storage tank, an inert gas supply and a cooking oil distribution means connected to said storage tank;

b) pressurizing said storage tank with said inert gas to thereby keep said quantity of cooking oil in an aseptic environment and to cause flow of said cooking oil through said cooking oil distribution means;

c) monitoring the cooking oil volume in said storage tank; and d) accessing said oil receiving structure, opening said valve and supplying cooking oil to said storage tank when required.

12. The method of claim 11, wherein said inert gas supplied is $CO_2$.

13. The method of claim 11, wherein the quantity of oil is monitored by an oil inventory monitoring and management system.

14. The method of claim 11, wherein said quantity of oil in said tank is monitored from a remote location.

15. The method of claim 11, wherein accessing said oil receiving structure includes controlling said inert gas supply.

16. The method of claim 11, including metering oil from said tank to an apparatus in said facility.

17. The method of claim 16, including removal of used oil from said apparatus.

18. The method of claim 17, including storing of used oil in an inert gas environment.

19. A system pressurized by inert gas for bulk storage and distribution of cooking oil comprising:

a) a bulk storage tank having an inlet coupling, an outlet coupling, and an inert gas supply connector, whereby said tank is placed inside a building where said oil is used;

b) an inlet structure attached to the exterior of said building comprised of a security device and a 3-way valve, whereby said valve permits shut-off and venting of said inert gas, filling of said storage tank with oil, and repressurization of said tank with said inert gas;

c) a fill and vent pipe and an inert gas pipe each connected at one end to said inlet coupling of said storage tank and being connected at the other end to said inlet structure;

d) an inert gas supply connected to said inert gas supply connector to provide inert gas to said tank thereby creating a pressurized environment therein, said inert gas supply having an inert gas pressure regulator to supply a predetermined pressure of inert gas to said tank;

e) a shut-off valve connected to said outlet coupling; and f) a fluid supply pipe structure connected at one end to said shut-off valve and having an oil metering means connected to the opposite end, said oil metering means comprised of a fluid flow shut-off mechanism and a fluid flow control mechanism.

20. The system of claim 19, wherein said inert gas is $CO_2$, wherein said storage tank is constructed of stainless steel, wherein said opposite end of said fluid supply pipe structure is flexible, and where said oil metering means is a dispensing valve.

21. The system of claim 19 further comprising an oil removal system.

22. The system of claim 21 where said oil removal system includes a drain tank.

23. The system of claim 21 wherein said oil removal system is pressurized by inert gas.

* * * * *